I. & I. N. GARDNER.
FEED CUTTER.
APPLICATION FILED OCT. 16, 1907.
902,068.
Patented Oct. 27, 1908.
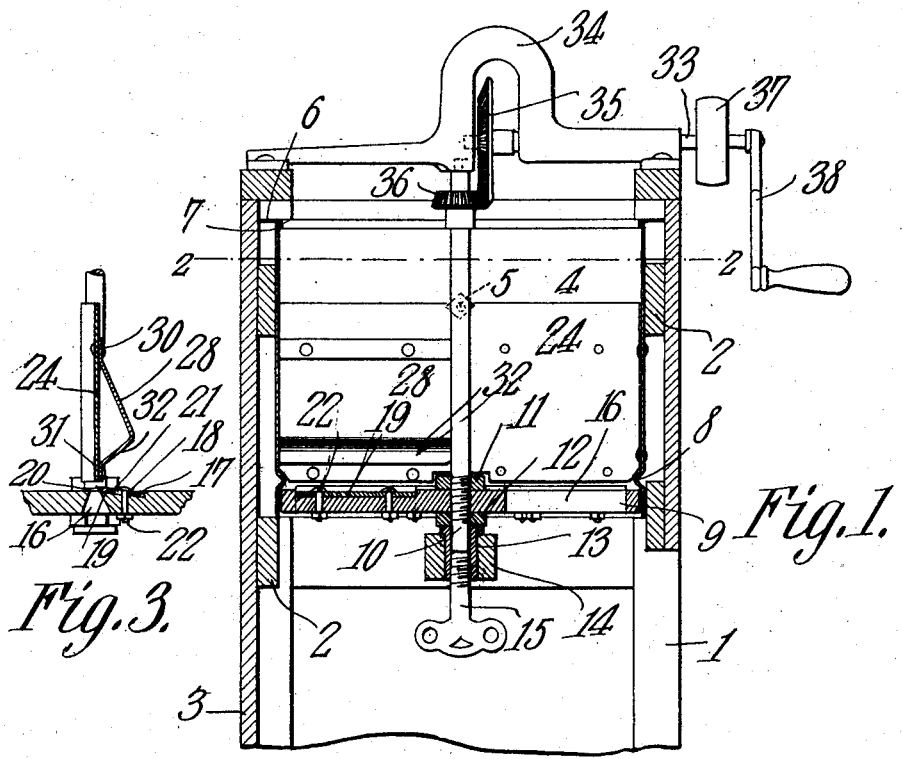
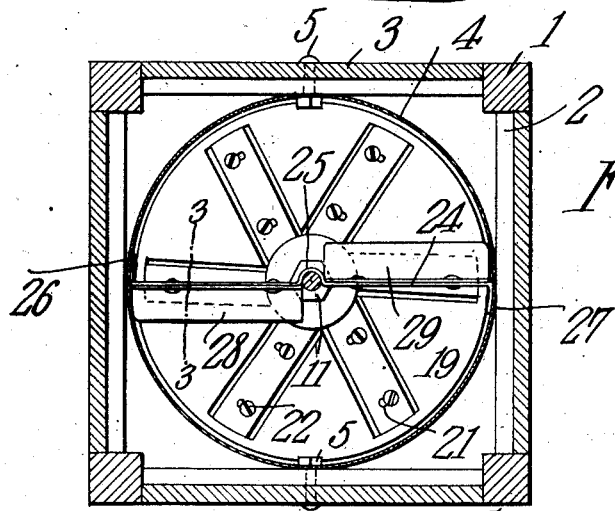
WITNESSES:
Ivan Gardner
Isaac N. Gardner
INVENTORS
By C. A. Snow & Co.
ATTORNEYS

UNITED STATES PATENT OFFICE.

IVAN GARDNER AND ISAAC NEWTON GARDNER, OF WAPELLA, ILLINOIS.

FEED-CUTTER.

No. 902,068.

Specification of Letters Patent.

Patented Oct. 27, 1908.

Application filed October 16, 1907. Serial No. 397,708.

*To all whom it may concern:*

Be it known that we, IVAN GARDNER and ISAAC N. GARDNER, citizens of the United States, residing at Wapella, in the county of Dewitt and State of Illinois, have invented a new and useful Feed-Cutter, of which the following is a specification.

This invention relates to improvements in machines for cutting or slicing vegetables, and the like, and it has for its object to provide a device of this character that is so simple in its construction that it may be manufactured inexpensively, and which is capable of readily reducing the vegetables or other food to slices of the desired thickness, the knives being so mounted that they may be readily adjusted to vary the thickness of the slices, as may be desired, and they may be readily removed for sharpening.

Another object of the invention is to provide improved devices for feeding the vegetables to the knives so that it is unnecessary for the operator to press the articles into engagement with the knives during the cutting operation.

To these and other ends, the invention comprises the various novel features of construction and combination and arrangement of parts, which will be hereinafter more fully described and pointed out particularly in the appended claims.

In the accompanying drawings:—Figure 1 represents a vertical section of a feed cutter constructed in accordance with the present invention. Fig. 2 represents a transverse section on the line 2—2 of Fig. 1. Fig. 3 represents a section on the line 3—3 of Fig. 2 showing the coöperative relation between the knives and one of the feeding devices.

Corresponding parts in the several figures are indicated throughout by similar characters of reference.

The feed cutter shown in the present embodiment of the invention is especially adapted for use in slicing or finely dividing vegetables, roots, and the like, in order that they may be used as cattle feed, and the machine in the present instance comprises a frame that may be of any suitable construction and serves to support the machine, the frame shown in this case consisting of a set of posts 1 connected by the horizontal members 2, the boards 3 secured to the horizontal members forming a casing which incloses the frame.

Mounted within the frame is a hopper or receptacle 4 adapted to receive the vegetables to be sliced, and this hopper may be of any suitable construction, that shown in the present instance being composed of sheet metal of a suitable gage which is rolled into cylindrical form, the bolts 5 securing it in fixed relation within the frame. The space between the hopper and the casing inclosing the frame is preferably closed by means of a plate 6 which is fitted above the hopper and has a downturned circular flange 7 which fits within the upper end of the hopper, this plate serving to exclude vegetables from the space between the hopper and the frame and it also provides a stay between the hopper and frame. The cylindrical hopper is provided at a point adjacent to its lower end with a circumferential bead or rib 8 which projects inwardly from the wall of the hopper.

The knives, in the present instance, are mounted on a rotary carrier 9 which is of a diameter sufficient to fit within the lower end of the hopper immediately below the circumferential bead or rib, the carrier being mounted on a spindle 10 which is arranged within the casing in any desired way and provided with a suitable operating mechanism, the carrier being secured to the spindle, in the present instance, by means of a pair of nuts 11 and 12 which are threaded on the spindle and clamped against the opposite sides of the knife carrier, the lower end of the spindle fitting into a bearing sleeve 13 which is supported in the cross bar 14, the latter being rigidly supported by the frame. The bearing sleeve is preferably threaded to receive a screw 15, the latter coöperating with the lower end of the spindle and serving to support it and to adjust the position of the knife carrier vertically. The knives are arranged substantially radially on the carrier, the latter being provided with a series of slots 16 through which the slices from the knives are discharged from the upper to the lower side of the carrier, and adjacent to each slot is a recess 17 having a knife engaging surface 18 which slopes upwardly as it approaches the slot, the knife blade 19 being in the form of a flat plate having its cutting edge 20 arranged above the slot and pointed toward the direction of rotation of the carrier, slots 21 being formed in the knife to receive bolts 22, the slots in the knife extending in a direction toward and from the slot 16 and serving to permit the knife to be adjusted in a direction toward or from said slot 16.

The devices employed in the present instance for feeding the vegetables to the knives comprise a partition 24 which extends diametrically across the hopper and has an intermediate portion formed into a semi-cylinder 25 to accommodate and assist in guiding the spindle, the ends of the partition being rigidly attached in any desired manner to the receptacle or other relatively fixed part of the machine, the partition, in the present instance, being provided with a pair of flanges 26 and 27 which are riveted or otherwise secured to the sides of the hopper. On the opposite sides of the partition are arranged a pair of deflector plates 28 and 29, those shown in the present instance being each composed of sheet metal having their upper and lower portions riveted or otherwise secured to the partition, as at 30 and 31, the metal adjacent to the lower edge extending laterally and upwardly to form an inclined deflector 32 which is adapted to engage the vegetables and press them downwardly toward the carrier, the knives removing successive slices from the vegetables as the knives pass the partition. Two of the feeding devices are preferably provided, one being arranged on each side of the partition and on opposite sides of the spindle, and as the vegetables are dropped into the hopper so that they fall on both sides of the partition, a double slicing operation will take place during the operation of the knife carrier.

The thickness of the slices may be varied, as desired, by adjusting the knife carrier vertically, and such an adjustment may be had in the present instance by turning the screw 15 in an appropriate direction.

Any suitable devices may be employed for driving the spindle, the operating means shown in the present instance comprising an operating shaft 33 journaled in a bracket 34 which extends across the top of the frame and is secured thereto, the inner end of the operating shaft being provided with a bevel gear 35 which coöperates with a pinion 36 fixed on the upper end of the spindle, the outer end of the operating shaft being provided with a pulley 37 so that the device may be operated by power when available, or it may be operated by a crank 38, the rotary movement of the operating shaft being transmitted to the spindle through the bevel gearing, and the spindle, in turn, transmitting its movement to the rotary knife carrier.

What is claimed is:—

1. In a feed cutter the combination with a supporting frame and a cylindrical receptacle mounted therein and having a circumferential rib adjacent its lower end; of a vertically adjustable spindle supported centrally within the receptacle, a radially slotted carrier secured to and revoluble with the spindle, the peripheral portion of said carrier being overhung by the rib, blades adjustably connected to the carrier and extending partly across the slots therein, a partition within the receptacle and above the carrier, and inclined deflecting blades secured upon and extending downward from opposite faces of the partition.

2. In a feed cutter the combination with a supporting frame, a cylindrical receptacle mounted therein and having a circumferential rib adjacent its lower end; of a vertical spindle adjustably mounted and extending centrally within the receptacle, a carrier mounted in the lower portion of the receptacle and having its periphery overhung by the rib, said carrier having radial slots, blades adjustably connected to the carrier adjacent the slots, means for rotating the spindle and carrier, a partition secured diametrically within the receptacle and partly embracing the spindle, and a deflecting blade secured to each face of the partition, each of said blades comprising a metallic strip angular in cross section and secured along its longitudinal edges to the partition, the lower portion of each blade being inclined upwardly away from the partition.

In testimony that we claim the foregoing as our own, we have hereto affixed our signatures in the presence of two witnesses.

IVAN GARDNER.
ISAAC NEWTON GARDNER.

Witnesses:
  GEORGE C. MAXWELL,
  JAMES CARPENTER.